(12) United States Patent
Koo et al.

(10) Patent No.: US 9,089,820 B2
(45) Date of Patent: Jul. 28, 2015

(54) SELECTIVE MEMBRANE HAVING A HIGH FOULING RESISTANCE

(75) Inventors: Ja-Young Koo, Billerica, MA (US); Yong-Doo Jung, Gumi (KR); Sung-Pyo Hong, Gumi (KR); Yeo-Jin Kim, Daegu (KR)

(73) Assignee: WOONGJIN CHEMICAL CO., LTD., Gumi-Si (KR)

( * ) Notice: Subject to any disclaimer, the term of this patent is extended or adjusted under 35 U.S.C. 154(b) by 801 days.

(21) Appl. No.: 13/330,167

(22) Filed: Dec. 19, 2011

(65) Prior Publication Data

US 2012/0211414 A1   Aug. 23, 2012

(30) Foreign Application Priority Data

Feb. 18, 2011 (KR) .................... 10-2011-0014779

(51) Int. Cl.
  *B01D 71/56* (2006.01)
  *B01D 67/00* (2006.01)
  *B01D 69/10* (2006.01)
  B01D 61/02 (2006.01)

(52) U.S. Cl.
  CPC ............ *B01D 71/56* (2013.01); *B01D 67/0093* (2013.01); *B01D 69/10* (2013.01); *B01D 61/025* (2013.01)

(58) Field of Classification Search
  None
  See application file for complete search history.

(56) References Cited

U.S. PATENT DOCUMENTS

| 4,277,344 | A | | 7/1981 | Cadotte | |
|---|---|---|---|---|---|
| 4,769,148 | A | * | 9/1988 | Fibiger et al. | ............ 210/500.38 |
| 4,830,885 | A | | 5/1989 | Tran et al. | |
| 4,872,984 | A | | 10/1989 | Tomaschke | |
| 4,950,404 | A | | 8/1990 | Chau | |
| 4,983,291 | A | | 1/1991 | Chau et al. | |
| 5,178,766 | A | | 1/1993 | Ikeda et al. | |
| 5,552,053 | A | * | 9/1996 | Ho et al. | ....................... 210/640 |
| 5,576,057 | A | | 11/1996 | Hirose et al. | |
| 5,614,099 | A | | 3/1997 | Hirose et al. | |
| 6,015,495 | A | | 1/2000 | Koo et al. | |
| 6,063,278 | A | | 5/2000 | Koo et al. | |
| 6,177,011 | B1 | | 1/2001 | Hachisuka et al. | |
| 6,245,234 | B1 | | 6/2001 | Koo et al. | |
| 6,280,853 | B1 | | 8/2001 | Mickols | |
| 6,913,694 | B2 | | 7/2005 | Koo et al. | |
| 7,537,697 | B2 | | 5/2009 | Koo et al. | |
| 7,913,857 | B2 | | 3/2011 | Koo et al. | |
| 2003/0116498 | A1 | * | 6/2003 | Mickols | ......................... 210/483 |
| 2006/0248447 | A1 | * | 11/2006 | Makkonen | ..................... 715/513 |
| 2007/0175820 | A1 | * | 8/2007 | Koo et al. | ................. 210/500.38 |
| 2007/0251883 | A1 | * | 11/2007 | Niu | .............................. 210/653 |
| 2010/0143733 | A1 | | 6/2010 | Mickols et al. | |

* cited by examiner

*Primary Examiner* — Krishnan S Menon
(74) *Attorney, Agent, or Firm* — Kriegsman & Kriegsman

(57) ABSTRACT

A selective membrane having a high fouling resistance. In one embodiment, the selective membrane is a composite polyamide reverse osmosis membrane having a hydrophilic coating made by covalently bonding a hydrophilic compound to the polyamide membrane, the hydrophilic compound including (i) a reactive group that is adapted to covalently bond directly to the polyamide membrane, the reactive group being at least one of a primary amine and a secondary amine; (ii) a non-terminal hydroxyl group; and (iii) an amide group. In another embodiment, the hydrophilic compound includes (i) a reactive group adapted to covalently bond directly to the polyamide membrane, the reactive group being at least one of a primary amine and a secondary amine; (ii) a hydroxyl group; and (iii) an amide group, the amide group being linked directly to the hydroxyl group by one of an alkyl group and an alkenyl group.

16 Claims, No Drawings

SELECTIVE MEMBRANE HAVING A HIGH FOULING RESISTANCE

BACKGROUND OF THE INVENTION

The present invention relates generally to selective membranes and relates more particularly to selective membranes having a high fouling resistance.

It is known that dissolved substances can be separated from their solvents by the use of various types of selective membranes, such selective membranes including—listed in order of increasing pore size—reverse osmosis membranes, ultrafiltration membranes and microfiltration membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. For certain applications, a rejection rate that is less than that which would otherwise be desirable may be acceptable in exchange for higher flux and vice versa.

One common type of reverse osmosis membrane is a composite membrane comprising a microporous support and a thin polyamide film formed on the microporous support. Typically, the polyamide film is formed by an interfacial polymerization of a polyfunctional amine and a polyfunctional acyl halide.

An example of the aforementioned composite polyamide reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) a monofunctional, monomeric (i.e., polymerizable) amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b), generally in an oven at about 60° C. to 110° C. for about 1 to 10 minutes, so as to form a water permeable membrane.

Other patents disclosing the use of additives in the solutions employed in the interfacial polycondensation reaction include: U.S. Pat. No. 4,983,291, inventors Chau et al., which issued Jan. 8, 1991; U.S. Pat. No. 5,576,057, inventors Hirose et al., which issued Nov. 19, 1996; U.S. Pat. No. 5,614,099, inventors Hirose et al., which issued Mar. 25, 1997; U.S. Pat. No. 4,950,404, inventor Chau, which issued Aug. 21, 1990; U.S. Pat. No. 4,830,885, inventors Tran et al., which issued May 16, 1989; U.S. Pat. No. 6,245,234, inventors Koo et al., which issued Jun. 12, 2001; U.S. Pat. No. 6,063,278, inventors Koo et al., which issued May 16, 2000; and U.S. Pat. No. 6,015,495, inventors Koo et al., which issued Jan. 18, 2000, all of which are incorporated herein by reference.

Another approach which has been taken to improve the performance of a composite polyamide reverse osmosis membrane is disclosed in U.S. Pat. No. 5,178,766, inventors Ikeda et al., which issued Jan. 12, 1993, and which is incorporated herein by reference. According to Ikeda et al., the salt rejection rate of a composite polyamide reverse osmosis membrane is said to be improved by covalently bonding to the polyamide film of said membrane a compound having a quaternary nitrogen atom. Said quaternary nitrogen atom-containing compound is bonded to the polyamide film through a reactive group present in the compound, said reactive group being an epoxy group, an aziridine group, an episulfide group, a halogenated alkyl group, an amino group, a carboxylic group, a halogenated carbonyl group, or a hydroxy group.

One problem encountered by many of the various composite polyamide reverse osmosis membranes described above is fouling, i.e., the undesired adsorption of solutes to the membrane, thereby causing a reduction in flux exhibited by the membrane. Fouling is typically caused by hydrophobic-hydrophobic and/or ionic interactions between the polyamide film of the membrane and those solutes present in the solution being filtered. As can readily be appreciated, fouling is undesirable not only because it results in a reduction in flux performance for the membrane but also because it requires that operating pressures be varied frequently to compensate for the variations in flux experienced during said reduction. In addition, fouling also requires that the membrane be cleaned frequently.

One approach to the problem of fouling is disclosed in U.S. Pat. No. 6,177,011, inventors Hachisuka et al., which issued Jan. 23, 2001, and which is incorporated herein by reference. According to Hachisuka et al., fouling can be reduced by coating the polyamide film of the membrane with at least one substance selected from the group consisting of an electrically neutral organic substance and a polymer that has a nonionic hydrophilic group, said organic substance or polymer preferably being a polyvinyl alcohol.

Another approach to the problem of fouling is disclosed in U.S. Pat. No. 6,280,853, inventor Mickols, which issued Aug. 28, 2001, and which is incorporated herein by reference. Mickols discloses a composite membrane that is said to have an improved resistance to fouling, said composite membrane comprising a porous support and a crosslinked polyamide surface having polyalkylene oxide groups grafted thereto.

Yet another approach to the problem of fouling is disclosed in U.S. Patent Application Publication No. US 2010/0143733 A1, inventors Mickols et al., which was published Jun. 10, 2010, and which is incorporated herein by reference. Mickols et al. discloses a polyamide membrane and method for making and using the same. According to one embodiment, a polyamide membrane includes a coating comprising a combination of a polyalkylene oxide compound and a polyacrylamide compound.

Still another approach to the problem of fouling is disclosed in U.S. Pat. No. 6,913,694, inventors Koo et al., which issued Jul. 5, 2005, and which is incorporated herein by reference. Koo et al. discloses a selective membrane having a high fouling resistance. In one embodiment, the selective membrane is a composite polyamide reverse osmosis membrane in which a hydrophilic coating has been applied to the polyamide layer of the membrane, the hydrophilic coating being made by (i) applying to the membrane a quantity of a polyfunctional epoxy compound, the polyfunctional epoxy compound comprising at least two epoxy groups, and (ii) then, cross-linking the polyfunctional epoxy compound in such a manner as to yield a water-insoluble polymer.

Still yet another approach to the problem of fouling is disclosed in U.S. Pat. No. 7,537,697, inventors Koo et al., which issued May 26, 2009, which is incorporated herein by reference. This patent discloses a selective membrane having a high fouling resistance. In one embodiment, the selective membrane is a composite polyamide reverse osmosis membrane in which a hydrophilic coating is applied to the polyamide layer of the membrane, the hydrophilic coating being made by covalently bonding a hydrophilic compound to residual acid chlorides of the polyamide membrane, the hydrophilic compound including (i) at least one reactive group that covalently bonds directly to the polyamide membrane, the at least one reactive group being at least one of a primary amine and a secondary amine, and (ii) at least one hydrophilic group selected from the group consisting of a hydroxyl group, a carbonyl group, a trialkoxysilane group, an anionic group and a tertiary amino group; (iii) wherein the hydrophilic compound is devoid of a polyalkylene oxide group.

Still a further approach to the problem of fouling is disclosed in U.S. Pat. No. 7,913,857, inventors Koo et al., which issued Mar. 29, 2011, which is incorporated herein by reference. This patent discloses a selective membrane having a high fouling resistance. In one embodiment, the selective membrane is a composite polyamide reverse osmosis membrane in which a hydrophilic coating is applied to the polyamide layer of the membrane, the hydrophilic coating being made by covalently bonding a hydrophilic compound to residual acid chlorides of the polyamide membrane, the hydrophilic compound including (i) at least one reactive group that covalently bonds directly to the polyamide membrane, the at least one reactive group being at least one of a primary amine and a secondary amine, and (ii) at least one non-terminal hydroxyl group.

SUMMARY OF THE INVENTION

It is an object of the present invention to provide a novel composite polyamide reverse osmosis membrane.

It is another object of the present invention to provide a membrane as described above that possesses high fouling resistance.

Accordingly, in furtherance of the above objects, as well as other objects to be described herein or to become apparent from the description that follows, there is provided a composite polyamide reverse osmosis membrane, said composite polyamide reverse osmosis membrane comprising, in a first aspect, (a) a microporous support; (b) a polyamide layer on said microporous support; and (c) a hydrophilic coating on said polyamide layer, said hydrophilic coating being formed by covalently bonding a hydrophilic compound to the polyamide membrane, wherein said hydrophilic compound includes (i) at least one reactive group adapted to covalently bond directly to the polyamide membrane, said at least one reactive group being at least one of a primary amine and a secondary amine; (ii) at least one non-terminal hydroxyl group; and (iii) at least one amide group.

According to a first embodiment of said first aspect, the aforementioned hydrophilic compound may be a compound represented by the formula I:

$$R_1—(CHOH)_l—CONR_4—R_2—NHR_3 \quad (I)$$

wherein $R_1$ is one of an aldehyde group (—CHO), a carboxylic acid group (—COOH), a nitrile group and a hydroxymethyl group (—CH$_2$OH), wherein $R_2$ is one of an alkyl group having carbon atoms ranging from 2 to 12, an alkenyl group having at least one double bond and carbon atoms ranging from 2 to 12, a cyclohexyl group, a phenylene group, a xylylene group, and a cyclohexanebismethyl group, wherein $R_3$ is one of hydrogen, an alkyl group having carbon atoms ranging from 1 to 4, and an alkenyl group having at least one double bond and carbon atoms ranging from 2 to 4, wherein $R_4$ is one of hydrogen, a methyl group, an ethyl group, and a propyl group, and wherein l is an integer ranging from 1 to 10.

According to a second embodiment of said first aspect, the hydrophilic compound may be a compound represented by the formula II:

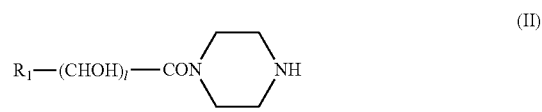

wherein $R_1$ is one of an aldehyde group (—CHO), a carboxylic acid group (—COOH), a nitrile group and a hydroxymethyl group (—CH$_2$OH), and wherein l is an integer ranging from 1 to 10.

According to a third embodiment of said first aspect, the hydrophilic compound may be a compound represented by the formula III:

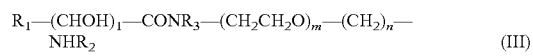

$$R_1—(CHOH)_l—CONR_3—(CH_2CH_2O)_m—(CH_2)_n—NHR_2 \quad (III)$$

wherein $R_1$ is one of an aldehyde group (—CHO), a carboxylic acid group (—COOH), a nitrile group and a hydroxymethyl group (—CH$_2$OH), wherein R$_2$ is one of hydrogen, an alkyl group having carbon atoms ranging from 1 to 4, and an alkenyl group having at least one double bond and carbon atoms ranging from 2 to 4, wherein R$_3$ is one of hydrogen, a methyl group, an ethyl group, and a propyl group, wherein l is an integer ranging from 1 to 10, wherein m is an integer ranging from 1 to 1000, and wherein n is an integer ranging from 2 to 6.

According to a fourth embodiment of said first aspect, the hydrophilic compound may be a compound represented by the formula IV:

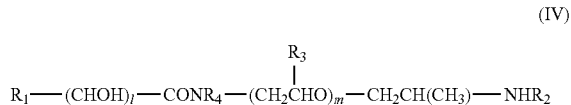
$$R_1—(CHOH)_l—CONR_4—(CH_2CHO)_m—CH_2CH(CH_3)—NHR_2 \quad (IV)$$

wherein R$_1$ is one of an aldehyde group (—CHO), a carboxylic acid group (—COOH), a nitrile group and a hydroxymethyl group (—CH$_2$OH), wherein R$_2$ is one of hydrogen, an alkyl group having carbon atoms ranging from 1 to 4, and an alkenyl group having at least one double bond and carbon atoms ranging from 2 to 4, wherein R$_3$ is one of a methyl group and an ethyl group, wherein l is an integer ranging from 1 to 10, wherein R$_4$ is one of hydrogen, a methyl group, an ethyl group, and a propyl group, and wherein m is an integer ranging from 1 to 100.

According to a fifth embodiment of said first aspect, the hydrophilic compound may be a compound represented by the formula V:

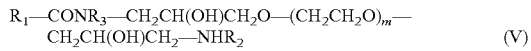
$$R_1—CONR_3—CH_2CH(OH)CH_2O—(CH_2CH_2O)_m—CH_2CH(OH)CH_2—NHR_2 \quad (V)$$

wherein R$_1$ is one of hydrogen, a methyl group, and an ethyl group, wherein R$_2$ is one of hydrogen, an alkyl group having carbon atoms ranging from 1 to 4, and an alkenyl group having at least one double bond and carbon atoms ranging from 2 to 4, wherein R$_3$ is one of hydrogen, a methyl group, an ethyl group, and a propyl group, and wherein m is an integer ranging from 1 to 1000.

According to a sixth embodiment of said first aspect, the hydrophilic compound may be a compound represented by the formula VI:

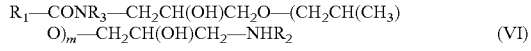
$$R_1—CONR_3—CH_2CH(OH)CH_2O—(CH_2CH(CH_3)O)_m—CH_2CH(OH)CH_2—NHR_2 \quad (VI)$$

wherein R$_1$ is one of hydrogen, a methyl group, and an ethyl group, wherein R$_2$ is one of hydrogen, an alkyl group having carbon atoms ranging from 1 to 4, and an alkenyl group having at least one double bond and carbon atoms ranging from 2 to 4, wherein R$_3$ is one of hydrogen, a methyl group, an ethyl group, and a propyl group, and wherein m is an integer ranging from 1 to 100.

According to a second aspect of the invention, there is provided a composite polyamide reverse osmosis membrane, said composite polyamide reverse osmosis membrane comprising (a) a microporous support; (b) a polyamide layer on said microporous support; and (c) a hydrophilic coating on said polyamide layer, said hydrophilic coating being formed by covalently bonding a hydrophilic compound to the polyamide membrane, wherein said hydrophilic compound includes (i) at least one reactive group adapted to covalently bond directly to the polyamide membrane, said at least one reactive group being at least one of a primary amine and a secondary amine; (ii) a hydroxyl group; and (iii) an amide group; (iv) wherein the hydroxyl group and the amide group are linked directly to one another by one of an alkyl group and an alkenyl group.

According to a first embodiment of said second aspect, the hydrophilic compound may be a compound represented by formula VII:

$$HO—R_1—CONR_4—R_2—NHR_3 \quad (VII)$$

wherein R$_1$ is one of an alkyl group having carbon atoms ranging from 1 to 4 and an alkenyl group having at least one double bond and carbon atoms ranging from 2 to 4, wherein R$_2$ is an alkyl group having carbon atoms ranging from 2 to 6, an alkenyl group having at least one double bond and carbon atoms ranging from 2 to 6, a cyclohexyl group, a phenylene group, a xylylene group, and a cyclohexanebismethyl group, wherein R$_3$ is one of hydrogen, an alkyl group having carbon atoms ranging from 1 to 4, and an alkenyl group having at least one double bond and carbon atoms ranging from 2 to 4, wherein R$_4$ is one of hydrogen, a methyl group, an ethyl group, and a propyl group, and wherein NR$_4$—R$_2$—NHR$_3$ can be replaced with a piperazinyl group.

According to a second embodiment of said second aspect, the hydrophilic compound may be a compound represented by formula VIII:

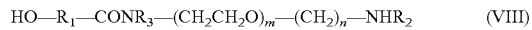
$$HO—R_1—CONR_3—(CH_2CH_2O)_m—(CH_2)_n—NHR_2 \quad (VIII)$$

wherein R$_1$ is one of an alkyl group having carbon atoms ranging from 1 to 4 and an alkenyl group having at least one double bond and carbon atoms ranging from 2 to 4, wherein R$_2$ is one of hydrogen, an alkyl group having carbon atoms ranging from 1 to 4, and an alkenyl group having at least one double bond and carbon atoms ranging from 2 to 4, wherein R$_3$ is one of hydrogen, a methyl group, an ethyl group, and a propyl group, wherein m is an integer ranging from 1 to 1000, and wherein n is an integer ranging from 2 to 6.

According to a third embodiment of said second aspect, the hydrophilic compound may be a compound represented by formula IX:

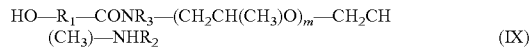
$$HO—R_1—CONR_3—(CH_2CH(CH_3)O)_m—CH_2CH(CH_3)—NHR_2 \quad (IX)$$

wherein R$_1$ is one of an alkyl group having carbon atoms ranging from 1 to 4 and an alkenyl group having at least one double bond and carbon atoms ranging from 2 to 4, wherein R$_2$ is one of hydrogen, an alkyl group having carbon atoms ranging from 1 to 4, and an alkenyl group having at least one double bond and carbon atoms ranging from 2 to 4, wherein R$_3$ is one of hydrogen, a methyl group, an ethyl group, and a propyl group, and wherein m is an integer ranging from 1 to 100.

The present invention is also directed to a method of producing the above-described composite polyamide reverse osmosis membrane.

The present invention is further directed to microfiltration membranes and ultrafiltration membranes that include the high fouling resistance coating of the present invention, as well as to a method of making such coated membranes.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

As noted above, the present invention is based on the unexpected discovery that the fouling resistance of a selective membrane, such as a composite polyamide reverse osmosis membrane, a microfiltration membrane or an ultrafiltration membrane, can be significantly increased by applying to the membrane a hydrophilic coating of the type described below.

The composite polyamide reverse osmosis membrane to which the hydrophilic coating of the present invention is applied may be virtually any composite polyamide reverse osmosis membrane of the type comprising a porous support and a polyamide film disposed on said porous support.

The aforementioned porous support is typically a microporous support. The particular microporous support employed is not critical to the present invention but is generally a polymeric material containing pore sizes which are of sufficient size to permit the passage of permeate therethrough but not large enough so as to interfere with the bridging over of the ultrathin membrane formed thereon. The pore size of the support will generally range from 1 to 500 nanometers inasmuch as pores which are larger in diameter than 500 nanometers will permit the ultrathin film to sag into the pores, thus disrupting the flat sheet configuration desired. Examples of microporous supports useful in the present invention include those made of a polysulfone, a polyether sulfone, a polyimide, a polyamide, a polyetherimide, polyacrylonitrile, poly(methyl methacrylate), polyethylene, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 µm, preferably about 40 to 75 µm.

The polyamide film of the present invention is typically the interfacial reaction product of a polyfunctional amine reactant and a polyfunctional amine-reactive reactant. The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxyl group or a halogen atom. Additional examples of suitable polyamines include alkanediamines, such as 1,3-propanediamine and its homologs with or without N-alkyl or aryl substituents, cycloaliphatic primary diamines, cycloaliphatic secondary diamines, such as piperazine and its alkyl derivatives, aromatic secondary amines, such as N,N"-dimethyl-1,3-phenylenediamine, N,N"-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine, and piperazine. (A composite polyamide reverse osmosis membrane made using piperazine as the polyfunctional amine reactant falls within a subclass of composite polyamide reverse osmosis membranes known as nanofiltration membranes. Nanofiltration membranes have larger "pores" than other composite polyamide reverse osmosis membranes and exhibit a low rejection rate of monovalent salts while exhibiting a high rejection rate of divalent salts and organic materials having a molecular weight greater than 300. Nanofiltration membranes are typically used to remove calcium and magnesium salts from water, i.e., to soften hard water, and to remove natural organic matter, such as humic acids from decaying plant leaves, from water. Humic acid is negatively charged at a pH above 6 and can be adsorbed on the membrane through hydrophobic interactions with the membrane surface.)

The polyfunctional amine reactant is typically present in an aqueous solution in an amount in the range of from about 0.1 to 20%, preferably 0.5 to 8%, by weight, of the aqueous solution. The pH of the aqueous solution is in the range of from about 7 to 13. The pH can be adjusted by the addition of a basic acid acceptor in an amount ranging from about 0.001% to about 5%, by weight, of the solution. Examples of the aforementioned basic acid acceptor include hydroxides, carboxylates, carbonates, borates, phosphates of alkali metals, and trialkylamines.

In addition to the aforementioned polyfunctional amine reactant (and, if desired, the aforementioned basic acid acceptor), the aqueous solution may further comprise additives of the type described in the patents incorporated herein by reference, such additives including, for example, polar solvents, amine salts and polyfunctional tertiary amines (either in the presence or absence of a strong acid).

The polyfunctional amine-reactive reactant employed in the present invention is one or more compounds selected from the group consisting of a polyfunctional acyl halide, a polyfunctional sulfonyl halide and a polyfunctional isocyanate. Preferably, the polyfunctional amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other polyfunctional amine-reactive reactants are disclosed in the patents incorporated herein by reference.

The polyfunctional amine-reactive reactant is typically present in an organic solvent solution, the solvent for said organic solvent solution comprising any organic liquid immiscible with water. The polyfunctional amine-reactive reactant is typically present in the organic liquid in an amount in the range of from about 0.005 to 5 wt % preferably 0.01 to 0.5 wt % of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

The hydrophilic coating of the present invention is formed by covalently bonding a hydrophilic compound of the type described below to residual acid chlorides of the polyamide membrane.

According to a first aspect of the invention, said hydrophilic compound includes (i) at least one reactive group adapted to covalently bond directly to the polyamide membrane, said at least one reactive group being at least one of a primary amine and a secondary amine; (ii) at least one non-terminal hydroxyl group; and (iii) at least one amide group.

According to a first embodiment of said first aspect, the aforementioned hydrophilic compound may be a compound represented by the formula I:

wherein $R_1$ is one of an aldehyde group (—CHO), a carboxylic acid group (—COOH), a nitrile group and a hydroxymethyl group (—CH$_2$OH), wherein $R_2$ is one of an alkyl group having carbon atoms ranging from 2 to 12, an alkenyl group having at least one double bond and carbon atoms ranging from 2 to 12, a cyclohexyl group, a phenylene group, a xylylene group, and a cyclohexanebismethyl group, wherein $R_3$ is one of hydrogen, an alkyl group having carbon atoms ranging from 1 to 4, and an alkenyl group having at least one double bond and carbon atoms ranging from 2 to 4, wherein $R_4$ is one of hydrogen, a methyl group, an ethyl group, and a propyl group, and wherein l is an integer ranging from 1 to 10.

Examples of compounds encompassed by Formula I include N-(2-aminoethyl)-2,3,4,5,6-pentahydroxyhexanamide, N-(3-aminopropyl)-2,3,4,5,6-pentahydroxyhexanamide, N-(4-aminobutyl)-2,3,4,5,6-pentahydroxyhexanamide, N-(5-aminopentyl)-2,3,4,5,6-pentahydroxyhexanamide, N-(6-aminohexyl)-2,3,4,5,6-pentahydroxyhexanamide, N-(2-aminoethyl)-2,3,4,5,6,7,8-heptahydroxyoctanamide, N-(3-aminopropyl)-2,3,4,5,6,7,8-heptahydroxyoctanamide, N-(4-aminobutyl)-2,3,4,5,6,7,8-heptahydroxyoctanamide, N-(5-aminopentyl)-2,3,4,5,6,7,8-heptahydroxyoctanamide, and N-(6-aminohexyl)-2,3,4,5,6,7,8-heptahydroxyoctanamide.

According to a second embodiment of said first aspect, the hydrophilic compound may be a compound represented by the formula II:

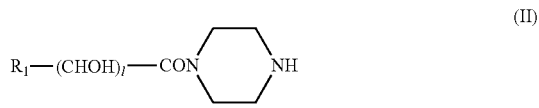

wherein $R_1$ is one of an aldehyde group (—CHO), a carboxylic acid group (—COOH), a nitrile group and a hydroxymethyl group (—CH$_2$OH), and wherein l is an integer ranging from 1 to 10.

According to a third embodiment of said first aspect, the hydrophilic compound may be a compound represented by the formula III:

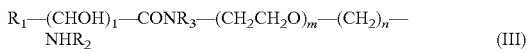

wherein $R_1$ is one of an aldehyde group (—CHO), a carboxylic acid group (—COOH), a nitrile group and a hydroxymethyl group (—CH$_2$OH), wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, wherein l is an integer ranging from 1 to 10, wherein m is an integer ranging from 1 to 1000, and wherein n is an integer ranging from 2 to 6.

Examples of compounds encompassed by Formula III include N-(8-amino-3,6-dioxaoctyl)-2,3,4,5,6-pentahydroxyhexanamide, N-(8-amino-3,6-dioxaoctyl)-2,3,4,5,6,7-hexahydroxyheptanamide, N-(8-amino-3,6-dioxaoctyl)-2,3,4,5,6,7,8-heptahydroxyoctanamide, N-(13-amino-4,7,10-trioxamideyl)-2,3,4,5,6-pentahydroxyhexanamide, N-(13-amino-4,7,10-trioxamidecyl)-2,3,4,5,6,7-hexahydroxyheptanamide, and N-(13-amino-4,7,10-trioxamideyl)-2,3,4,5,6,7,8-heptahydroxyoctanamide.

According to a fourth embodiment of said first aspect, the hydrophilic compound may be a compound represented by the formula IV:

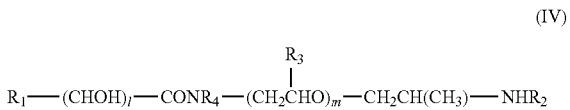

wherein $R_1$ is one of an aldehyde group (—CHO), a carboxylic acid group (—COOH), a nitrile group and a hydroxymethyl group (—CH$_2$OH), wherein $R_2$ is one of hydrogen, an alkyl group having carbon atoms ranging from 1 to 4, and an alkenyl group having at least one double bond and carbon atoms ranging from 2 to 4, wherein $R_3$ is one of a methyl group and an ethyl group, wherein $R_4$ is one of hydrogen, a methyl group, an ethyl group, and a propyl group, wherein l is an integer ranging from 1 to 10, and wherein m is an integer ranging from 1 to 100.

According to a fifth embodiment of said first aspect, the hydrophilic compound may be a compound represented by the formula V:

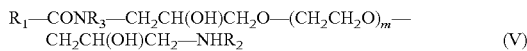

wherein $R_1$ is one of hydrogen, a methyl group, and an ethyl group, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, and wherein m is an integer ranging from 1 to 1000.

According to a sixth embodiment of said first aspect, the hydrophilic compound may be a compound represented by the formula VI:

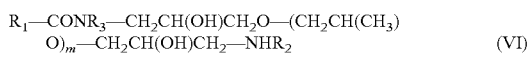

wherein $R_1$ is one of hydrogen, a methyl group, and an ethyl group, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, and wherein m is an integer ranging from 1 to 100.

According to a second aspect of the invention, the hydrophilic compound includes (i) at least one reactive group adapted to covalently bond directly to the polyamide membrane, said at least one reactive group being at least one of a primary amine and a secondary amine; (ii) a hydroxyl group; and (iii) an amide group; (iv) wherein the hydroxyl group and the amide group are linked directly to one another by one of an alkyl group and an alkenyl group.

According to a first embodiment of said second aspect, the hydrophilic compound may be a compound represented by formula VII:

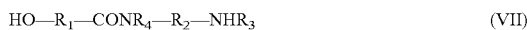

wherein $R_1$ is one of an alkyl group having carbon atoms ranging from 1 to 4 and an alkenyl group having at least one double bond and carbon atoms ranging from 2 to 4, wherein $R_2$ is an alkyl group having carbon atoms ranging from 2 to 6, an alkenyl group having at least one double bond and carbon atoms ranging from 2 to 6, a cyclohexyl group, a phenylene group, a xylylene group, and a cyclohexanebismethyl group, wherein $R_3$ is one of hydrogen, an alkyl group having carbon atoms ranging from 1 to 4, and an alkenyl group having at least one double bond and carbon atoms ranging from 2 to 4, wherein $R_4$ is one of hydrogen, a methyl group, an ethyl group, and a propyl group, and wherein $NR_4$—$R_2$—$NHR_3$ can be replaced with a piperazinyl group.

According to a second embodiment of said second aspect, the hydrophilic compound may be a compound represented by formula VIII:

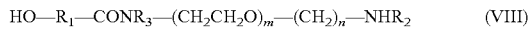

$$HO—R_1—CONR_3—(CH_2CH_2O)_m—(CH_2)_n—NHR_2 \quad (VIII)$$

wherein $R_1$ is one of an alkyl group having carbon atoms ranging from 1 to 4 and an alkenyl group having at least one double bond and carbon atoms ranging from 2 to 4, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, wherein m is an integer ranging from 1 to 1000, and wherein n is an integer ranging from 2 to 6.

According to a third embodiment of said second aspect, the hydrophilic compound may be a compound represented by formula IX:

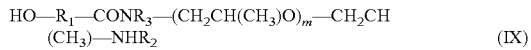

$$HO—R_1—CONR_3—(CH_2CH(CH_3)O)_m—CH_2CH(CH_3)—NHR_2 \quad (IX)$$

wherein $R_1$ is one of an alkyl group having carbon atoms ranging from 1 to 4 and an alkenyl group having at least one double bond and carbon atoms ranging from 2 to 4, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, and wherein m is an integer ranging from 1 to 100.

The hydrophilic compound described above is covalently bonded to the residual acid chlorides of the polyamide membrane by contacting the polyamide membrane with an aqueous solution comprising the hydrophilic compound. The hydrophilic compound is typically present in the aqueous solution in an amount ranging from about 0.0001 wt % to 8 wt % of the aqueous solution, preferably about 0.001 wt % to 4 wt % of the aqueous solution.

In accordance with the teachings of the present invention, a composite polyamide reverse osmosis membrane having a high fouling resistance may be made as follows: First, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried at a temperature below 50° C., preferably by air-drying at room temperature, for about 1 minute. The hydrophilic coating of the present invention is then formed on the polyamide membrane by contacting, for example, by dipping or by spraying, the thus-formed polyamide membrane with an aqueous solution of the above-described hydrophilic compound for a period in the range of about 5 seconds to about 10 minutes, preferably about 20 seconds to 4 minutes, at a temperature of about room temperature to 95° C., whereby said hydrophilic compound covalently bonds to the polyamide membrane through the reaction of the primary or secondary amino group with the residual acid chloride of the polyamide membrane. The resulting product is then rinsed in a basic aqueous solution, such as 0.2% sodium carbonate, from about 1 to 30 minutes at room temperature to 95° C., and then rinsed with deionized water.

As noted above, the hydrophilic coating of the present invention is not limited to use with composite polyamide reverse osmosis membranes but can also be applied directly to conventional microporous membranes, such as microfiltration membranes and ultrafiltration membranes, to help resist fouling thereof by proteins, macromolecules and colloids when such membranes are used in surface water treatment, protein separations, and food and beverage processing. A conventional microfiltration membrane is typically a microporous support of the type described above that has a pore size of about 0.1μ-10μ. A conventional ultrafiltration membrane is typically a microporous support of the type described above that has a pore size of about 0.001μ-0.05μ.

The following examples are provided for illustrative purposes only and are in no way intended to limit the scope of the present invention:

Example 1

A 140 μm thick microporous polysulfone support including the backing non-woven fabric was soaked in an aqueous solution containing 2 wt % of meta-phenylenediamine (MPD) and 0.2 wt % 2-ethyl-1,3-hexanediol for 40 seconds. The support was drained and nip rolled to remove the excess aqueous solution. Then, the coated support was dipped in 0.1 wt % solution of trimesoyl chloride (TMC) in Isopar® solvent (Exxon Corp.) for 1 minute followed by draining the excess organic solution off the support. The resulting composite membrane was air-dried for about 1 minute and then soaked at room temperature for 2 minutes in a mixture of 0.03 wt % of N-(2-aminoethyl)-2,3,4,5,6-pentahydroxyhexanamide (AEPH) and 0.05% $Na_2CO_3$ in deionized water. AEPH was made from the reaction of ethylenediamine with gluconic acid lactone in a 1:1 molar ratio in water at room temperature for 24 hours. The resulting product was then rinsed in 0.2% $Na_2CO_3$ aqueous solution for 30 minutes at room temperature, and then rinsed in deionized water.

The initial performance of the membrane was measured by passing an aqueous solution containing 2000 ppm of NaCl through the membrane in a crossflow mode at 225 psi and 25° C. The salt rejection was 99.5% and the flux was 32.5 gfd. The fouling resistance of the membrane was then evaluated under the same conditions described above by further adding 50 ppm dry milk to the feed water at a pH of 6.4. (The protein of dry milk in an aqueous solution may exist as protein molecules and colloids, i.e., aggregates of protein molecules, and can be adsorbed to the membrane through hydrophobic interactions with the membrane surface.) After circulating the feed water through the membrane for 2 hours, the salt rejection was 99.7% and the flux was 28.1 gfd.

Example 2

The same procedure as set forth in Example 1 was carried out for Example 2, except that 0.05 wt % of AEPH and 0.05% $Na_2CO_3$ in deionized water were used. The performance of the resulting membrane under the same conditions described above for Example 1 is shown below in Table I.

Example 3

The same procedure as set forth in Example 1 was carried out for Example 3, except that 0.03 wt % N-(8-amino-3,6- dioxaoctyl)-2,3,4,5,6-pentahydroxyhexanamide (ADOPH) was used, instead of 0.03 wt % AEPH. ADOPH was made from the reaction of 2,2'-(ethylenedioxy)bis(ethylamine) with gluconic acid lactone in a 1:1 molar ratio in water at room temperature for 24 hours.

The performance of the resulting membrane under the same conditions described above for Example 1 is shown below in Table I.

Example 4

The same procedure as set forth in Example 1 was carried out for Example 4, except that 0.05 wt % ADOPH was used, instead of 0.03 wt % AEPH. The performance of the resulting membrane under the same conditions described above for Example 1 is shown below in Table I.

Example 5

The same procedure as set forth in Example 1 was carried out for Example 5, except that 0.03 wt % N-(13-amino-4,7,10-trioxamideyl)-2,3,4,5,6-pentahydroxyhexanamide (ATOPH) was used, instead of 0.03 wt % AEPH. The performance of the resulting membrane under the same conditions described above for Example 1 is shown below in Table I.

Example 6

The same procedure as set forth in Example 1 was carried out for Example 6, except that 0.05% ATOPH was used, instead of 0.03 wt % AEPH. The performance of the resulting membrane under the same conditions described above for Example 1 is shown below in Table I.

Comparative Example 1

The same procedure as set forth in Example 1 was carried out for Comparative Example 1, except that no hydrophilic coating was applied to the composite membrane. The initial salt rejection was 99%, and the initial flux was 27.1 gfd. When subjected to the same fouling conditions of Example 1, the salt rejection was 99.5%, and the flux was 21.2 gfd as shown in Table 1.

TABLE I

| Membrane | Initial Salt Rejection (%) | Initial Flux (gfd) | Final Flux in the presence of dry milk (gfd) | Flux Decline (%) |
| --- | --- | --- | --- | --- |
| Example 1 | 99.5 | 32.5 | 28.1 | 13.5 |
| Example 2 | 99.6 | 30.8 | 27.4 | 10.9 |
| Example 3 | 99.3 | 22.3 | 20.2 | 9.4 |
| Example 4 | 99.4 | 19.7 | 18.6 | 5.5 |
| Example 5 | 99.4 | 19.2 | 18.2 | 5.2 |
| Example 6 | 99.6 | 18.3 | 17.8 | 2.7 |
| Comparative Example 1 | 99.0 | 27.1 | 21.2 | 21.8 |

As can be seen from Table I, the coated membranes of Examples 1-6 all exhibited a considerably smaller decrease in flux in the presence of the fouling agent (50 ppm dry milk) than did the uncoated membrane (Comparative Example 1). This is advantageous because, as noted above, a consistency in flux over a long period of time is highly desirable since it obviates the need to continuously vary the operating pressure and to wash the membrane to remove fouling agents therefrom. It should also be recognized that, whereas the final flux in the present case was measured only after two hours of use, such membranes are expected to be continuously used for considerably longer periods of time. Accordingly, the final flux values given above are much more representative of the flux properties of the membranes over their respective lifetimes of use than are the initial flux values.

Also, it should be noted that, when the coated membranes were washed following their two-hour period of use, their respective fluxes substantially returned to their initial fluxes whereas the untreated membrane, when washed following its two-hour period of use, only approached about 85% of its initial flux.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A composite polyamide reverse osmosis membrane, said composite polyamide reverse osmosis membrane comprising:
 (a) a microporous support;
 (b) a polyamide layer on said microporous support; and
 (c) a hydrophilic coating on said polyamide layer, said hydrophilic coating being formed by covalently bonding a hydrophilic compound to the polyamide membrane, wherein said hydrophilic compound includes
  (i) at least one reactive group covalently bonded directly to the polyamide membrane, said at least one reactive group, prior to bonding, being at least one of a primary amine and a secondary amine;
  (ii) at least one non-terminal hydroxyl group; and
  (iii) at least one amide group.

2. The composite polyamide reverse osmosis membrane as claimed in claim 1 wherein said hydrophilic compound is a compound represented by formula I:

wherein $R_1$ is one of an aldehyde group (—CHO), a carboxylic acid group (—COOH), a nitrile group and a hydroxymethyl group (—$CH_2OH$), wherein $R_2$ is one of an alkyl group having carbon atoms ranging from 2 to 12, an alkenyl group having at least one double bond and carbon atoms ranging from 2 to 12, a cyclohexyl group, a phenylene group, a xylylene group, and a cyclohexanebismethyl group, wherein $R_3$ is one of hydrogen, an alkyl group having carbon atoms ranging from 1 to 4, and an alkenyl group having at least one double bond and carbon atoms ranging from 2 to 4, wherein $R_4$ is one of hydrogen, a methyl group, an ethyl group, and a propyl group, and wherein 1 is an integer ranging from 1 to 10.

3. The composite polyamide reverse osmosis membrane as claimed in claim 2 wherein said hydrophilic compound is selected from the group consisting of N-(2-aminoethyl)-2,3,4,5,6-pentahydroxyhexanamide, N-(3-aminopropyl)-2,3,4,5,6-pentahydroxyhexanamide, N-(4-aminobutyl)-2,3,4,5,6-pentahydroxyhexanamide, N-(5-aminopentyl)-2,3,4,5,6-pentahydroxyhexanamide, N-(6-aminohexyl)-2,3,4,5,6-pentahydroxyhexanamide, N-(2-aminoethyl)-2,3,4,5,6,7,8-heptahydroxyoctanamide, N-(3-aminopropyl)-2,3,4,5,6,7,8-heptahydroxyoctanamide, N-(4-aminobutyl)-2,3,4,5,6,7,8-heptahydroxyoctanamide, N-(5-aminopentyl)-2,3,4,5,6,7,8-heptahydroxyoctanamide, and N-(6-aminohexyl)-2,3,4,5,6,7,8-heptahydroxyoctanamide.

4. The composite polyamide reverse osmosis membrane as claimed in claim 3 wherein said hydrophilic compound is N-(2-aminoethyl)-2,3,4,5,6-pentahydroxyhexanamide.

5. The composite polyamide reverse osmosis membrane as claimed in claim 1 wherein said hydrophilic compound is a compound represented by formula II:

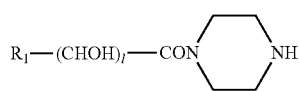
(II)

wherein $R_1$ is one of an aldehyde group (—CHO), a carboxylic acid group (—COOH), a nitrile group and a hydroxymethyl group (—CH$_2$OH), and wherein l is an integer ranging from 1 to 10.

6. The composite polyamide reverse osmosis membrane as claimed in claim 1 wherein said hydrophilic compound is a compound represented by formula III:

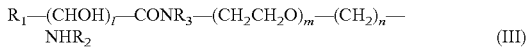
(III)

wherein $R_1$ is one of an aldehyde group (—CHO), a carboxylic acid group (—COOH), a nitrile group and a hydroxymethyl group (—CH$_2$OH), wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, wherein l is an integer ranging from 1 to 10, wherein m is an integer ranging from 1 to 1000, and wherein n is an integer ranging from 2 to 6.

7. The composite polyamide reverse osmosis membrane as claimed in claim 6 wherein said hydrophilic compound is selected from the group consisting of N-(8-amino-3,6-dioxaoctyl)-2,3,4,5,6-pentahydroxyhexanamide, N-(8-amino-3,6-dioxaoctyl)-2,3,4,5,6,7-hexahydroxyheptanamide, N-(8-amino-3,6-dioxaoctyl)-2,3,4,5,6,7,8-heptahydroxyoctanamide, N-(13-amino-4,7,10-trioxatridecyl)-2,3,4,5,6-pentahydroxyhexanamide, N-(13-amino-4,7,10-trioxatridecyl)-2,3,4,5,6,7-hexahydroxyheptanamide, and N-(13-amino-4,7,10-trioxatridecyl)-2,3,4,5,6,7,8-heptahydroxyoctanamide.

8. The composite polyamide reverse osmosis membrane as claimed in claim 7 wherein said hydrophilic compound is selected from the group consisting of N-(8-amino-3,6-dioxaoctyl)-2,3,4,5,6-pentahydroxyhexanamide and N-(13-amino-4,7,10-trioxatridecyl)-2,3,4,5,6-pentahydroxyhexanamide.

9. The composite polyamide reverse osmosis membrane as claimed in claim 1 wherein said hydrophilic compound is a compound represented by formula IV:

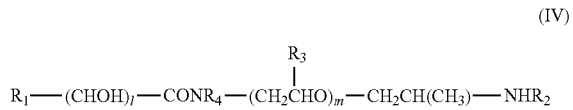
(IV)

wherein $R_1$ is one of an aldehyde group (—CHO), a carboxylic acid group (—COOH), a nitrile group and a hydroxymethyl group (—CH$_2$OH), wherein $R_2$ is one of hydrogen, an alkyl group having carbon atoms ranging from 1 to 4, and an alkenyl group having at least one double bond and carbon atoms ranging from 2 to 4, wherein $R_3$ is one of a methyl group and an ethyl group, wherein l is an integer ranging from 1 to 10, wherein $R_4$ is one of hydrogen, a methyl group, an ethyl group, and a propyl group, and wherein m is an integer ranging from 1 to 100.

10. The composite polyamide reverse osmosis membrane as claimed in claim 1 wherein said hydrophilic compound is a compound represented by formula V:

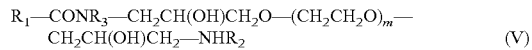
(V)

wherein $R_1$ is one of hydrogen, a methyl group, and an ethyl group, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, and wherein m is an integer ranging from 1 to 1000.

11. The composite polyamide reverse osmosis membrane as claimed in claim 1 wherein said hydrophilic compound is a compound represented by formula VI:

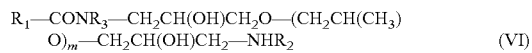
(VI)

wherein $R_1$ is one of hydrogen, a methyl group, and an ethyl group, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, and wherein m is an integer ranging from 1 to 100.

12. A composite polyamide reverse osmosis membrane, said composite polyamide reverse osmosis membrane comprising:
(a) a microporous support;
(b) a polyamide layer on said microporous support; and
(c) a hydrophilic coating on said polyamide layer, said hydrophilic coating being formed by covalently bonding a hydrophilic compound to the polyamide membrane, wherein said hydrophilic compound includes
(i) at least one reactive group covalently bonded directly to the polyamide membrane, said at least one reactive group, prior to bonding, being at least one of a primary amine and a secondary amine;
(ii) a hydroxyl group; and
(iii) an amide group;
(iv) wherein the hydroxyl group and the amide group are linked directly to one another by one of an alkyl group and an alkenyl group.

13. The composite polyamide reverse osmosis membrane as claimed in claim 12 wherein said alkyl group is an alkyl group having carbon atoms ranging from 1 to 4 and wherein said alkenyl group is an alkenyl group having at least one double bond and carbon atoms ranging from 2 to 4.

14. The composite polyamide reverse osmosis membrane as claimed in claim 12 wherein said hydrophilic compound is a compound represented by formula VII:

(VII)

wherein $R_1$ is one of an alkyl group having carbon atoms ranging from 1 to 4 and an alkenyl group having at least one double bond and carbon atoms ranging from 2 to 4, wherein $R_2$ is an alkyl group having carbon atoms ranging from 2 to 6, an alkenyl group having at least one double bond and carbon atoms ranging from 2 to 6, a cyclohexyl group, a phenylene group, a xylylene group, and a cyclohexanebismethyl group, wherein $R_3$ is one of hydrogen, an alkyl group having carbon atoms ranging from 1 to 4, and an alkenyl group having at least one double bond and carbon atoms ranging from 2 to 4, wherein $R_4$ is one of hydrogen, a methyl group, an ethyl group, and a propyl group, and wherein $NR_4-R_2-NHR_3$ can be replaced with a piperazinyl group.

15. The composite polyamide reverse osmosis membrane as claimed in claim 12 wherein said hydrophilic compound is a compound represented by formula VIII:

$$HO-R_1-CONR_3-(CH_2CH_2O)_m-(CH_2)_n-NHR_2 \qquad (VIII)$$

wherein $R_1$ is one of an alkyl group having carbon atoms ranging from 1 to 4 and an alkenyl group having at least one double bond and carbon atoms ranging from 2 to 4, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, wherein m is an integer ranging from 1 to 1000, and wherein n is an integer ranging from 2 to 6.

16. The composite polyamide reverse osmosis membrane as claimed in claim 12 wherein said hydrophilic compound is a compound represented by formula IX:

$$HO-R_1-CONR_3-(CH_2CH(CH_3)O)_m-CH_2CH(CH_3)-NHR_2 \qquad (IX)$$

wherein $R_1$ is one of an alkyl group having carbon atoms ranging from 1 to 4 and an alkenyl group having at least one double bond and carbon atoms ranging from 2 to 4, wherein $R_2$ is one of hydrogen, an alkyl group having carbon atoms ranging from 1 to 4, and an alkenyl group having at least one double bond and carbon atoms ranging from 2 to 4, wherein $R_3$ is one of hydrogen, a methyl group, an ethyl group, and a propyl group, and wherein m is an integer ranging from 1 to 100.

* * * * *